(12) United States Patent
Kenney et al.

(10) Patent No.: US 7,020,091 B2
(45) Date of Patent: Mar. 28, 2006

(54) APPARATUS, AND ASSOCIATED METHOD, FOR ESTIMATING CHANNEL CONDITIONS OF A COMMUNICATION CHANNEL OF A COMMUNICATION SYSTEM

(75) Inventors: Thomas J. Kenney, San Diego, CA (US); Nick Carbone, San Diego, CA (US)

(73) Assignee: Nokia Mobile Phones Limited, Espoo (FI)

( * ) Notice: Subject to any disclaimer, the term of this patent is extended or adjusted under 35 U.S.C. 154(b) by 876 days.

(21) Appl. No.: 09/918,378

(22) Filed: Jul. 30, 2001

(65) Prior Publication Data

US 2003/0021236 A1 Jan. 30, 2003

(51) Int. Cl.
*H04J 3/14* (2006.01)
*H04L 1/00* (2006.01)
*H04L 5/02* (2006.01)

(52) U.S. Cl. .................. 370/250; 370/329; 370/337; 370/321; 370/208

(58) Field of Classification Search .............. 370/321, 370/329, 210, 337, 431–463
See application file for complete search history.

(56) References Cited

U.S. PATENT DOCUMENTS

| 5,150,378 A | * | 9/1992 | Mui ................................ 1/1 |
| 6,377,607 B1 | * | 4/2002 | Ling et al. .................. 375/130 |
| 6,693,920 B1 | * | 2/2004 | Montojo et al. ............ 370/503 |

* cited by examiner

*Primary Examiner*—Chi Pham
*Assistant Examiner*—Christopher Grey
(74) *Attorney, Agent, or Firm*—Alston & Bird LLP

(57) ABSTRACT

Apparatus, and an associated method, for estimating the channel phase of a communication channel upon which data is communicated. When implemented in an IS-95 cellular communication system in which 1xEV-DO technology is deployed, the channel phase estimate provided by an estimator is based upon both a pilot signal and a MAC-data signal. MAC-data bits are removed out of the MAC-data signal by a MAC bit processor, and the resultant indications are combined with indications of a pilot signal to form the channel phase estimate.

18 Claims, 4 Drawing Sheets

APPARATUS, AND ASSOCIATED METHOD, FOR ESTIMATING CHANNEL CONDITIONS OF A COMMUNICATION CHANNEL OF A COMMUNICATION SYSTEM

The present invention relates generally to a manner by which to estimate channel conditions upon a channel used to communicate data in a communication system, such as a cellular communication system constructed pursuant to an IS-95 standard in which 1xEV-DO technology is deployed. More particularly, the present invention relates to apparatus, and associated method, by which to estimate channel conditions by measuring signal indicia associated with MAC (Medium Access Control)-signals, or other non-pilot signals. In an IS-95 system in which 1xEV-DO technology is deployed, MAC-data signals are sent during time slots adjacent to a time slot during which a pilot signal is communicated. Measurement of MAC-data signal indicia is made subsequent to communication of the MAC-data signal upon the MAC channel. The MAC channel signal indicia is utilized, alone or in part, to estimate channel conditions. The channel condition estimate is then used to alter, as appropriate, signals subsequently communicated by a sending station. Improved channel estimation is possible as signal indicia associated with both a pilot signal and a MAC-data signal are together used to estimate the channel conditions.

BACKGROUND OF THE INVENTION

The communication of information between two or more communication stations is provided through operation of a communication system. The communication stations between which the information is communicated are connected by a communication channel. The information which is to be communicated between the communication stations is converted into a form to permit its communication on the communication channel.

A radio communication system is a communication system in which the communication channels connecting the communication stations are formed upon radio links which define radio channels. A radio communication system generally provides for improved communication mobility contrasted to conventional wire line communication systems as the use of radio channels to interconnect the communication stations obviates the need for conventional wire line connections to interconnect the communication stations.

A cellular communication system is exemplary of a radio communication system. Cellular communication systems, constructed according to various communication standards, have been installed throughout significant geographical areas of the world. Subscribers to a cellular communication system are able to communicate telephonically therethrough through the use of a mobile station when the mobile station is positioned within an area encompassed by the communication system. Telephonic communication of both voice and non-voice information is generally permitted.

Technological advancements in digital communication and processing techniques have permitted the development and implementation of new cellular, and other, communication systems capable of communicating increased amounts, and types, of data at improved quality levels. An exemplary cellular communication system which utilizes digital communication techniques is a system described in the IS-95 standard promulgated by the EIA/TIA. Ongoing efforts are made to improve upon the initial implementation as improvements in digital communication and processing techniques permit. An IS-2000 communication standard has also been promulgated. The IS-2000 standard also sets forth operational parameters for a cellular communication system. The IS-95 and IS-2000 communication standards utilize CDMA (Code-Division, Multiple-Access) communication techniques. The standards are sometimes referred to as the IS-95/IS-2000 family of standards.

Proposals have also been set forth relating to a so-called 1xEV-DO technology to be deployed together with an IS-95-based communication system. An IS-95 system which deploys 1xEV-DO technology is an evolutionary step from the IS-2000 system and deploys packet data wireless technology. The 1xEV-DO technology is somewhat disjoined from the IS-95/IS-2000 family of standards in that a system in which the 1xEV-DO technology is deployed is unable to share the same frequencies as those existing IS-95 and IS-2000 systems. The 1xEV-DO technology utilizes TDMA (Time-Division, Multiple-Access) schemes instead of the CDMA access scheme utilized in the IS-95/IS-2000 standards.

In a system in which 1xEV-DO technology is deployed, a channel is defined by a frequency and time slot combination. Pursuant to a communication session, system users are assigned time slots upon which to communicate to effectuate the communications pursuant to the communication session. The time slots are sub-divided into three basic payloads. A data payload, an MAC (Medium Access Control) payload, and a pilot payload are all defined.

Channel conditions upon which the information is communicated pursuant to a communication session typically exhibits fading, or other distortion, which interferes with the quality of the transfer of the informational content of the information which is to be transferred pursuant to the communication session. To overcome poor channel conditions, for instance, the coding rate at which the information is coded is increased, prior to its communication upon the channel, to increase the redundancy of the information. By increasing the redundancy of the information, a communication station which receives the information subsequent to its communication upon the channel is better able to recreate the informational content of the information once received. Increasing the coding rate, however, reduces the informational throughput capacity. As high communication throughput rates are generally desired, a high coding rate is generally used only when channel conditions are poor.

Channel condition estimates are made which are indicative of the channel conditions of the communication channel to be used to effectuate communication of information. Responsive to the channel condition estimate, decisions are made, for example, of the coding that is to be used in subsequent communication of information.

Conventionally, a channel estimate is obtained through evaluation of signal characteristics of a pilot signal generated during operation of an IS-95 or IS-2000 communication system. When, however, the pilot signal is of a relatively low SNR (Signal-To Noise Ratio), the estimate might be unreliable. Communication of a MAC-data signal in a system in which 1xEV-DO technology is deployed, once communicated upon a communication channel, also can provide information upon which to estimate channel conditions of the communication channel.

If a manner could be provided by which to utilize such signal indicia, improved communication qualities of resultant communication systems would be possible.

It is in light of this background information related to the estimation of channel conditions defined in a communication system that the significant improvements of the present invention have evolved.

SUMMARY OF THE INVENTION

The present invention, accordingly, advantageously provides apparatus, and an associated method, by which to estimate channel conditions upon a channel used to communicate data in a cellular, or other, communication system, such as a cellular communication system constructed pursuant to an IS-95 standard in which 1xEV-DO technology is deployed.

Through operation of an embodiment of the present invention, a manner is provided by which to estimate channel conditions by measuring signal indicia associated with MAC-data signals, or other non-pilot signals. The measured signal indicia of such signals, alone, or in combination with measurement of signal indicia associated with a pilot signal, permits a more reliable estimation of the channel conditions by which to form the channel estimate. Subsequent selection of communication system operating parameters is better able to properly be made as the channel estimate is better able to be accurately made.

In one aspect of the present invention, advantage is made of the large processing gain associated with MAC-data communicated during MAC time slots which define MAC channels. In an IS-95 system in which 1xEV-DO technology is deployed, many separate active mobile stations in the communication system are sent MAC-data during a single time slot. The power levels of the signals containing the bits to be communicated to the separate mobile stations are together measured to provide an indication of the channel conditions upon which the MAC-data is communicated. Responsive to measurement of the power levels of the MAC-data signals, subsequent to their transmission upon the communication channel, an estimate is made of the channel conditions, such as in terms of a channel phase estimate.

In another aspect of the present invention, the informational content of the MAC-data is removed from the MAC-data signal prior to determination of the power level thereof. The power level of the MAC-data signal is of a level dependent upon the channel conditions of the channel upon which the MAC-data signal is communicated. The power level of the MAC-data signal is, for instance, directly proportional to the channel conditions. That is to say, when the channel conditions are good, the MAC-data signal power level is, when detected at a communication station which receives the signal, of a relatively high level. And, when the communication conditions are relatively poor, the power level of the MAC-data signal, when received at the communication station at which the measurements are made, is of a relatively low value. The amount of attenuation of the signal increases as the channel conditions deteriorate.

In one implementation, a single-user realization is provided. A MAC-data signal chip received at a mobile station is detected by a receive portion of the mobile station. The MAC-data chip bit is removed out of the received MAC-data signal. A pilot signal broadcast to the mobile station is also detected at the receive portion of the mobile station. The MAC-data signal, stripped of the MAC-data bit, and the pilot signal are together utilized to form an estimate of the channel conditions through the formation of a channel phase estimate.

In another implementation, a multiple-user realization is provided. In the multi-user realization, MAC-data signal chips communicated to more than one mobile station is utilized in the formation of a channel condition estimate. Separate MAC-data signal chips are communicated to all of the active mobile stations during normal operation of the IS-95 system in which 1xEV-DO technology is utilized. A mobile station detects its own MAC-data signal, as well as MAC-data signals transmitted to other active mobile stations. The MAC-data signal chip bits are removed from their received signal indications, and the resultant signals are combined by summing such signals theretogether. The combined signal indications together with indications of a pilot signal, also broadcast to the mobile station, are together used in the determination of a channel condition estimate, here a channel phase estimate.

As additional indicia, in addition to pilot signal indicia conventionally utilized in the estimation of channel conditions, is utilized in the formation of a channel phase estimate, an estimate of improved accuracy is possible. By providing an improved-accuracy estimate, selection of operating parameters of the communication system are better selected.

In these and other aspects, therefore, apparatus, and an associated method, is provided for a communication system in which a first communication station communicates data to at least a second communication station. The data includes a first-data type portion communicated upon a first channel, and at least a second data type portion is communicated upon at least a second channel. A channel phase characteristic associated with the first and at least second channels is estimated. A first data type operator is coupled to receive indications of the first data-type portion sent to the first communication station upon the first channel. The first data-type operator operates upon the first data-type to form a representation of the first-data portion subsequent to communication upon the first channel. A second data-type operator is coupled to receive indications of the second data-type portions sent to the second communication station upon the second channel. The second data-type operator operates upon the second data-type to form a representation of the second-type data portion subsequent to communication upon second channel. A channel phase estimator is coupled to the first data-type operator to receive the representations of the first data-type portion. The channel phase estimator is coupled also to the second data-type operator to receive the representation of the second data-type portion. The channel phase estimator estimates the channel phase responsive to values of the representations of both of the first and second data-type portions, respectively.

More complete appreciation of the present invention and the scope thereof can be obtained from the accompanying drawings which are briefly summarized below, the detailed description of the presently preferred embodiments of the invention, and the appended claims.

DETAILED DESCRIPTION OF THE DRAWINGS

Figure 1:
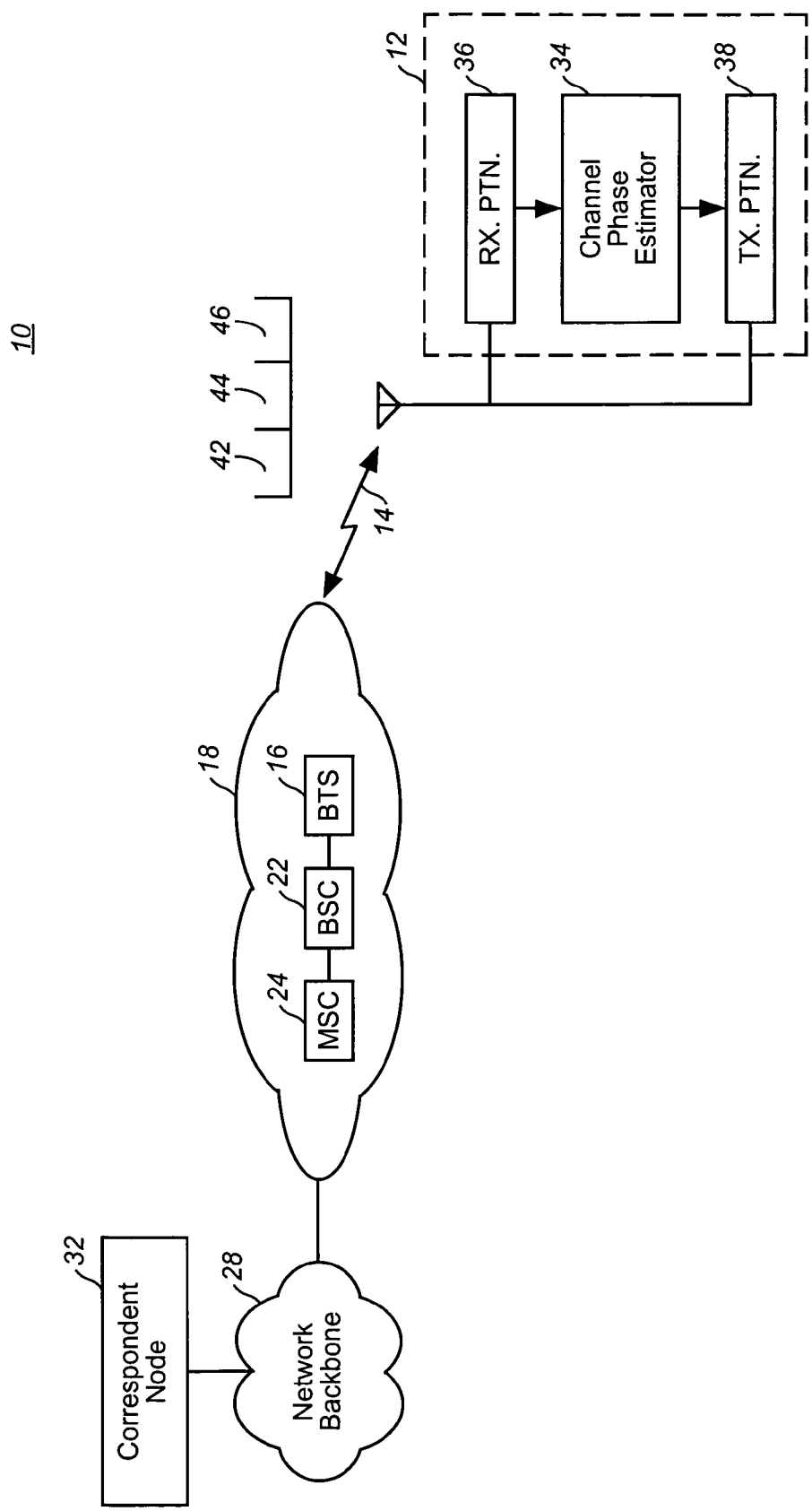
FIG. 1 illustrates a functional block diagram of a cellular radio communication system in which an embodiment of the present invention is operable.

Referring first to FIG. 1, a communication system, shown generally at 10, provides for radio communications with a mobile station 12. In the exemplary implementation, the communication system forms an IS-95 cellular radio communication system in which 1xEV-DO technology is deployed. While the following description shall describe exemplary operation of the communication system with respect to its exemplary implementation, an embodiment of the present invention can analogously be implemented in other communication systems, as appropriate.

Communications with the mobile station are effectuated by way of radio communication channels defined upon a radio link 14. Communications are effectuated between the mobile station and a network portion of the communication system, here shown to include a base transceiver station 16. The base transceiver station forms a portion of the network infrastructure part 18 of the communication system. The network infrastructure part is here shown further to include a base station controller (BSC) 22 to which the base transceiver station is coupled. And, the base station controller is coupled to a mobile switching center (MSC) 24.

The network infrastructure part 18 is coupled to a network backbone 28, such as a PSTN (Public-Switched, Telephonic Network) or a packet data network (PDN), such as the internet.

A correspondent device 32 is shown to be coupled to the network 28. The correspondent device is representative of a communication device at which data is originated for communication to the mobile station to be terminated thereat. Analogously, the correspondent devices are also representative of a communication station at which data originated at the mobile station 12 can be terminated, subsequent to communication over the radio link 14 and through the network of the communication system.

The radio channels defined upon the radio links 14 are typically non-ideal channels. That is, data communicated upon the radio channels is susceptible to distortion caused, for instance, by fading conditions. Fading conditions occur, for instance, due to multi-path propagation. The distortion introduced upon the data during its communication upon the radio channels defined upon the radio links distort the values of the data during transmission upon the radio channels. Compensation must be made for the distortion introduced upon the values of the data in order for the informational content of the data to be recovered properly, once received. As noted previously, various manners are utilized by which to increase the likelihood that the informational content of the data can be recovered in spite of communication of the data upon a channel which exhibits fading, or other distortion.

In order to select the amount of coding by which the data is to be encoded, an estimate is made of the channel phase which is representative of the channel conditions. Operation of an embodiment of the present invention provides an improved manner by which to obtain the channel phase estimate.

Accordingly, the mobile station 12 is shown to include a channel phase estimator 34 coupled to a receive portion 36 and a transmit portion 38 of the mobile station. Data communicated to the mobile station is analyzed by the channel phase estimator and, responsive thereto, a channel phase estimate is made. That is, the channel phase estimator is coupled to the receive portion to receive indications of selected data received at the mobile station. Responsive to the indications provided to the indications provided to the channel phase estimator, a channel phase estimate is made. Thereafter, an indication of the estimated channel phase is provided to the transmit portion of the mobile station to be transmitted back to the network portion of the communication system, thereby to permit change, if appropriate of the coding rate of subsequently-communicated data to the mobile station. The channel phase estimate can also be utilized at the mobile station, also to facilitate communication of data pursuant to operation of the communication system.

Figure 2:
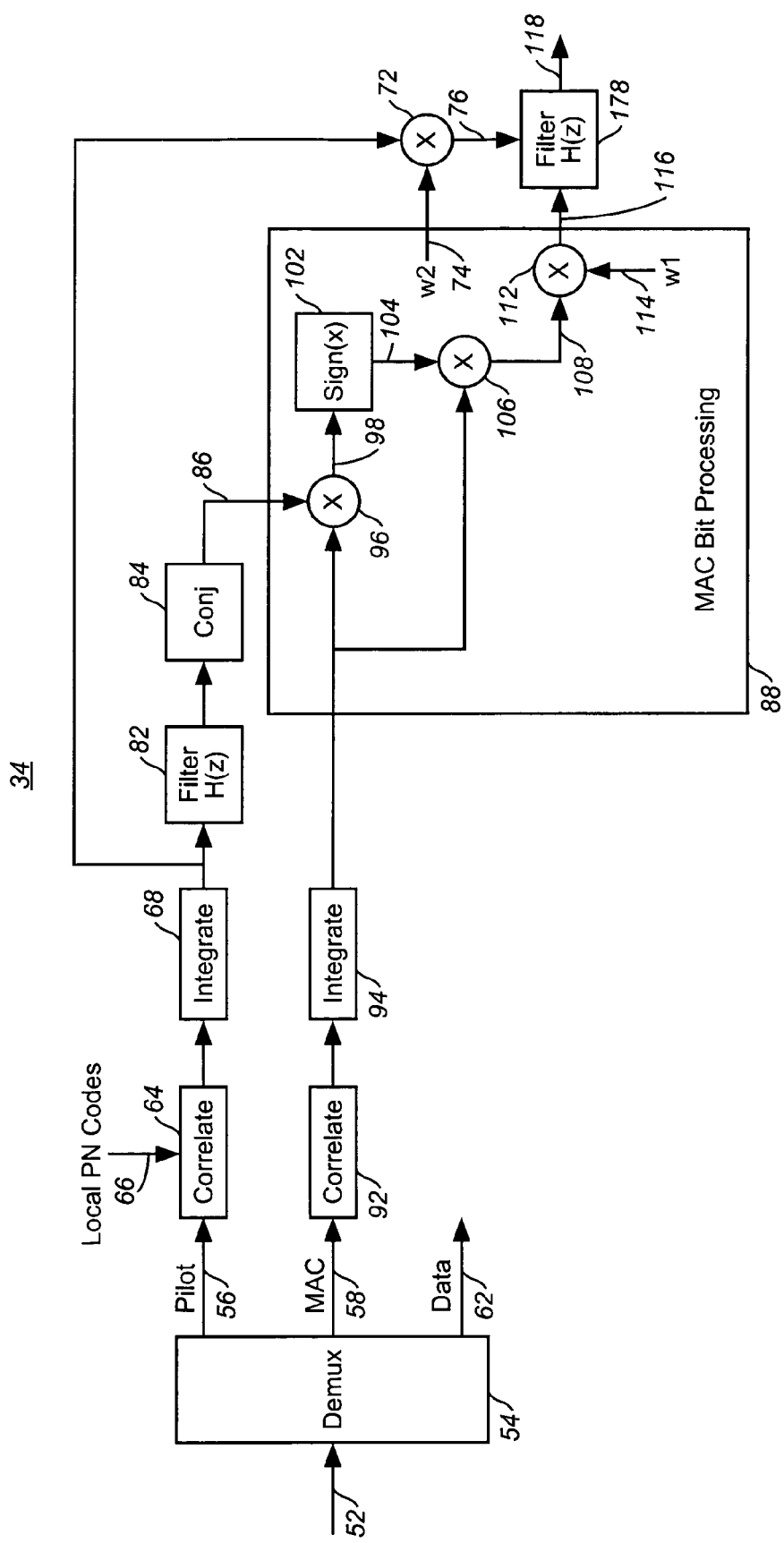
FIG. 2 illustrates a functional block diagram of an embodiment of the present invention which forms a portion of the communication system shown in FIG. 1.

In an IS-95 system in which 1xEV-DO technology is deployed defines time slots in which assignments are made pursuant to a communication session. FIG. 1 also illustrates three exemplary time slots, time slots 42, 44, and 46, within which assignments are made. The time slot 44 forms a pilot signal slot defining a pilot channel. The time slots 42 and 46 form MAC-data slots upon which MAC-data signals are transmitted, thereby defining MAC-data channels. As the IS-95 system in which 1xEV-DO technology is deployed is a multi-user communication system, a plurality of users are able to communicate concurrently pursuant to separate communication sessions. The MAC-data slots 42 and 46 are used to communicate to the plurality of different mobile stations MAC-data information. Each user, i.e., mobile station, is sent MAC-data covered by a WALSH function assigned to each user. The MAC-data signal, or signals, have associated therewith power levels analogous to the power level at which a pilot signal is transmitted. Use is made of the MAC-data signals pursuant to operation of an embodiment of the present invention by which to estimate the channel phase of the channels defined upon the time slots 42–46. FIG. 2 illustrates the channel estimator 34 of an embodiment of the present invention. Indications of the data received by the receive portion 36 are provided, here by way of the line 52 to a demultiplexor (demux) 54. The demultiplexor, and the other elements shown to form the channel phase estimator, are functionally represented. Such elements are implemented in any desired manner and, in other implementations, are distributed throughout the circuitry of the mobile station.

The data provided on the line 52 is demultiplexed by the demultiplexor on separate lines 56, 58, and 62. Separate payloads, a pilot signal payload, a MAC-data signal payload, and a data signal payload, are generated on the lines 56, 58, and 62, respectively. The line 62 is operated upon by other portions of the mobile station and further discussion of actions taken upon the data signal are not further described herein.

The pilot data signal generated on the line 56 is correlated, indicated by the correlate block 64 with a local copy of a PN sequence, here represented to be input by way of the line 66. Once correlated, the pilot signal is integrated, as indicated by the integrate function 68 over M chips. Subsequent to integration, the pilot signal is forwarded upon two separate paths. A top (as shown) path extends to a weighting element 72 at which the signal is weighted by a weighting factor w to input, here, by way of the line 74. The weighted signal is provided by way of a line 76 to a filter block 78.

A second path, subsequent to integration by the integrate function 68 extends to a filter element 82 at which the pilot signal is filtered, and, once filtered, the signal is conjugated by a conjugate (conj) function 84. The resultant signal, generated on the line 86, is used as a channel estimate, provided to a MAC bit processor 88.

The MAC-data signal generated on the line 58 is also correlated, hereby a correlate function 92. Once correlated, the signal is integrated by an integrate function 94 for K chips. Once integrated, the signal is forwarded on two separate paths. A top (as shown) path extends to a mixer 96 at which the signal is multiplied by the pilot signal generated on the line 86. The combined signal, generated on the line 98, is sign-detected, indicated by the sign (x) function 102, thereby to estimate the value of the MAC-data bit contained in the signal. The estimate formed thereby is generated on the line 104 which is provided to a mixer 106. A second path extending from the integrate function is also coupled to the mixer 106. Multiplication is performed, and the product is generated on the line 108. A mathematical representation of operation shall be presented below. The product generated on the line 108 is free of MAC-data, and the product is provided to a signal weighting element 112. A weighting value w1 is provided on the line 114 by which to weight the product value, and the weighted product is generated on the line 116 and provided to the filter 178. The weighted product and the weighted pilot signal generated on the line 76 are combined at the filter and a channel phase estimate is formed therefrom, here generated on the line 118.

In the exemplary implementation, the weighting value w1 and w2 are computed by maximizing the signal-to-noise ratio of the estimate in an optimal fashion. Or, if processing power is limited, the values are obtained in sub-optimal fashion. Optimality is attained with knowledge, through estimation, of the channel gains and the noise variance.

Figure 3:
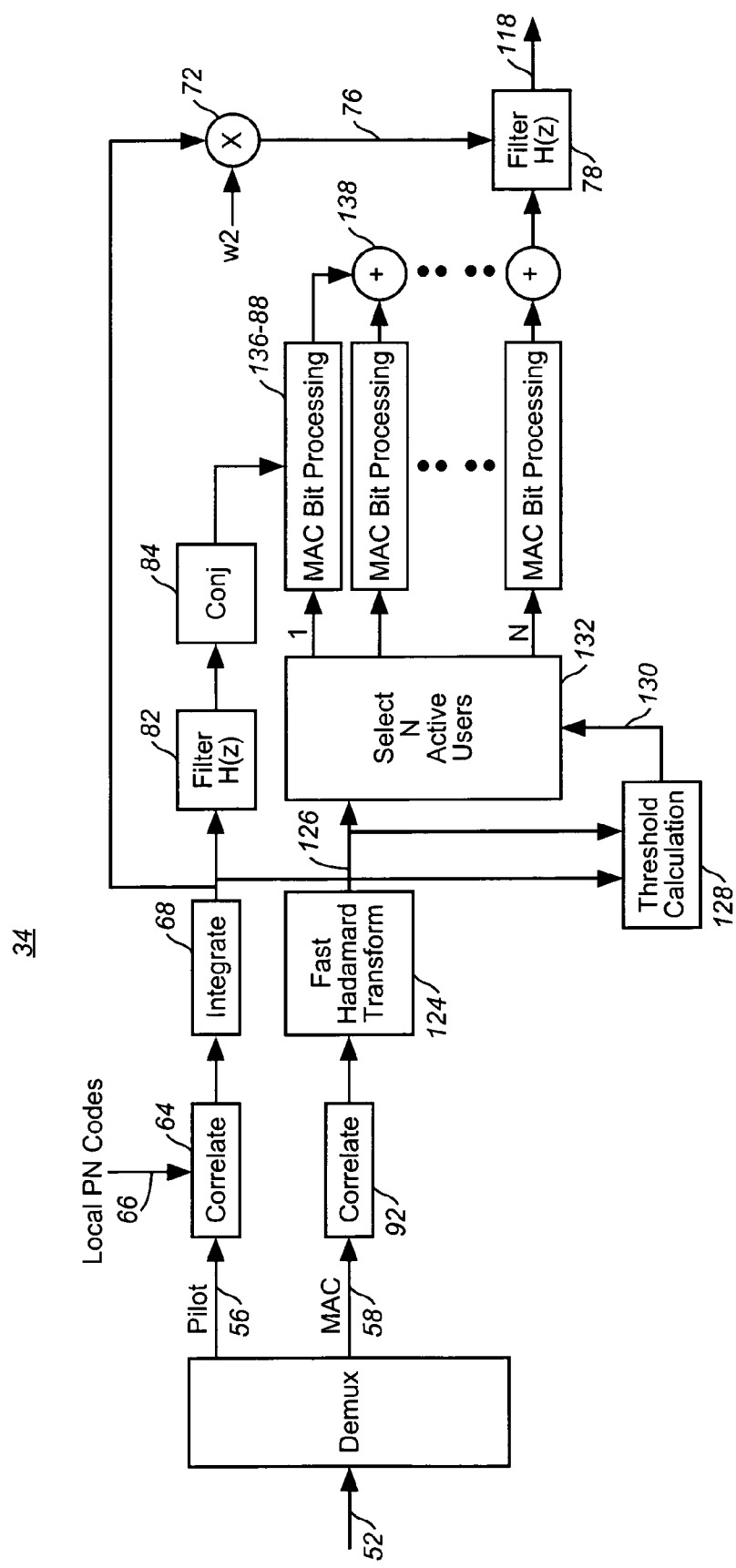
FIG. 3 illustrates a functional block diagram, similar to that shown in FIG. 2, but of an implementation of another embodiment of the present invention.

FIG. 3 illustrates the estimator 34 of another embodiment of the present invention. Here, the multi-user nature of the communication system is utilized to further improve the accuracy of the channel estimate. In typical operation, a plurality of active users are assigned separate MAC WALSH functions. Since each user is assigned a WALSH function, detection of all of the MAC-data signal parts transmitted to all active users, removing their corresponding data bits, then summing the signals provides a further improved channel estimate.

Within each time slot 42 and 46 (shown in FIG. 1) the MAC channel is formed of 256 chips, and the pilot slot 44 (also shown in FIG. 1) is formed of 192 chips, additional information is attainable from the MAC-data channel. And, detection of as many active users as possible and use of the information obtained from signals sent to such active users facilitates improved accuracy of the channel estimation.

Here, functional elements corresponding to elements described with respect to the implementation shown in FIG. 2 are commonly referenced. Again, a demultiplexor 54 demultiplexes indications of a receive signal provided thereto on the line 52 into separate paths, here including the paths 56 and 58, upon which a pilot signal and a MAC-data signal, respectively, are generated. Analogous to processing performed upon the pilot signal in the embodiment shown in FIG. 2, the estimator 34 here also performs a correlation operation, indicated by the correlate function 64, integration operations indicated by the integrate function 68, weighting operations performed by the weighting element 72, filtering functions performed by the filter 82, and conjugate calculation performed by the conjugate function 84.

The MAC-data signal is correlated by the correlate function 92. Thereafter, the correlated MAC-data signal is applied to a fast hadamard transform element 94 at which determination is made of all possible active users. Determinations made thereat are provided by way of the line 126 to a threshold calculation element 128 at which the output generated on the line 126 is compared with the pilot signal, here provided by way of the line 130, to determine the number of active users, or the number of users with signals transmitted thereto with energy levels above the threshold. A number N of active users is selected, indicated by the block 132. And, then, MAC bit processing is performed, indicated by the elements 136, on each MAC-data bit in manners analogous to those described with respect to operation of the MAC bit processor 88, shown in FIG. 2. And, summations are performed by the summing elements 138, leaving the weighted channel estimate for each active user. The resultant summation is provided to the filter 78 to be combined with the pilot estimate generated on the line 76, and the channel phase estimate is generated on the line 118 responsive thereto. The following is a mathematical analysis of operation of the channel phase estimator.

The MAC sub-slots are shared among all current data users whereby each user is assigned a unique Walsh number. Users are divided between the I and Q data channels evenly. This signal is written as:

$$x(n) = \sum_i g_i d_i^k(n) W_i^{64}(n) + j \sum_l g_l d_l^k(n) W_l^{64}(n)$$

Where $g_i$ is the gain for the $I^{th}$ user on the I channel, $d_i^k$ is the $k^{th}$ data bit for the $I^{th}$ user on the I channel and $W_i^{64}$ is the Walsh function from the 64 order Walsh set for the $I^{th}$ user on the I channel. The same holds for the Q channel where the users are denoted by l. This signal is then complex correlated with a complex PN sequence providing:

$$x(n) = \left( \sum_i g_i d_i^k(n) W_i^{64}(n) + j \sum_l g_l d_l^k(n) W_l^{64}(n) \right) (c_I + j c_Q)$$

Where $c_I$ and $c_Q$ are the PN sequences. If this signal is then passed through a channel with unknown phase the result is written as (where noise has been ignored):

$$x(n) = \left( \sum_i g_i d_i^k(n) W_i^{64}(n) + j \sum_l g_l d_l^k(n) W_l^{64}(n) \right) (c_I + j c_Q) e^{j\theta}$$

Where $\theta$ is the unknown channel phase (for brevity it is assumed that the phase is constant over the 1.25 ms slot).

The signal above is what would be seen at the receiver's input, where it is assumed that timing is recovered perfectly in the receiver. The signal is then correlated with a local copy of the PN codes:

$$x(n) = \left( \sum_i g_i d_i^k(n) W_i^{64}(n) + j \sum_l g_l d_l^k(n) W_l^{64}(n) \right) (c_I + j c_Q) e^{j\theta} (c_I + j c_Q)$$

Which reduces to:

$$x(n) = 2 \sum_i g_i d_i^k(n) W_i^{64}(n) \cos\theta - 2 \sum_l g_l d_l^k(n) W_l^{64}(n) \sin\theta +$$

-continued $$j\left(\sum_i g_i d_i^k(n) W_i^{64}(n)\sin\theta + 2\sum_l g_l d_l^k(n)\sin\theta + 2\sum_l g_l d_l^k(n) W_l^{64}(n)\cos\theta\right)$$

If multiplication is made by a given Walsh number for a specific user, m, is performed and integrate over the Walsh length the following results:

$$z_m(n)=128 g_m(\cos\theta + j\sin\theta)d_m^k$$

Clearly, if the data bit is removed, then the following is attained:

$$z_m(n)=128 g_m e^{j\theta}$$

Which can be used to attain an estimate of the channel phase. In the above equation, it is clear that this estimate is scaled by a gain for that user, therefore, it is advantageous to use the largest gain user in the entire set, or to estimate all users and add them.

Figure 4:
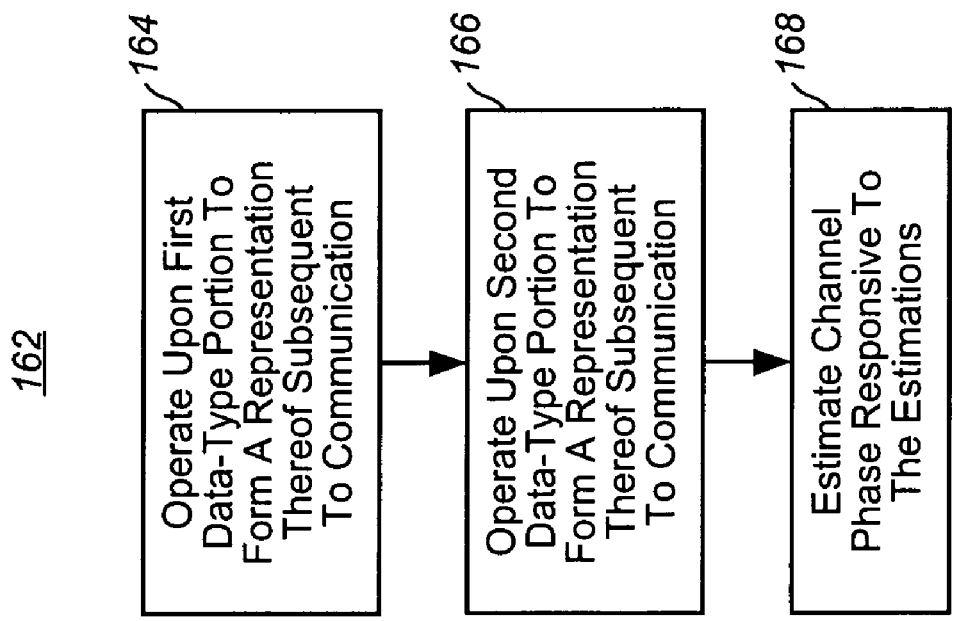
FIG. 4 illustrates a method flow diagram listing the method steps of the method of operation of an embodiment of the present invention.

FIG. 4 illustrates a method flow diagram, shown generally at 162, of an embodiment of the present invention. The method estimates a channel phase characteristic associated with first and at least second channels upon which a first communication station communicates data to at least a second communication station.

First, and as indicated by the block 164, indications of a first data-type portion sent to the second communication station upon the first channel is operated upon, thereby to form a representation of the first-type data portion subsequent to communication upon the first channel. Then, and as indicated by the block 166, indications of a second data-type portion sent to the second communication station upon the second channel are operated upon, thereby to form a representation of the second-type data portion subsequent to communication upon the second channel.

Then, and as indicated by the block 168, the channel phase is estimated responsive to values of the representations of both the first data-type portion and the second data-type portion.

Thereby, a manner is provided by which to estimate channel conditions by measuring signal indicia associated with MAC-data signals, as well as pilot signals. As additional signal indicia is utilized in the estimation of the channel conditions, improved accuracy of the channel estimation is permitted.

The preferred descriptions are of preferred examples for implementing the invention, and the scope of the invention should not necessarily be limited by this description. The scope of the present invention is defined by the following claims.

The invention claimed is:

1. Apparatus for a first communication station to which data is communicated, the data including a first data-type portion communicated upon a first channel and a MAC (Medium Access Control) data-type portion communicated upon a MAC data channel, said apparatus for estimating a channel phase characteristic associated with the first channel and the MAC data channel said, apparatus comprising:

a first data type operator coupled to receive indications of the first data-type portion sent to the first communication station upon the first channel, said first data-type operator for operating upon the first data-type to form a representation of the first-type data portion subsequent to communication upon the first channel;

a MAC data-type operator coupled to receive indications of the MAC data-type portion sent to the first communication station upon the MAC data channel, said MAC data-type operator for operating upon the MAC data-type portion to strip informational content out of the MAC data-type portion, thereafter to form a representation of the MAC data portion subsequent to communication upon the MAC data channel; and a channel phase estimator coupled to said first data-type operator to receive the representations of the first data-type portion and coupled to said MAC data-type operator to receive the representation of the MAC data-type portion, said channel phase estimator for estimating the channel phase responsive to values of the representations formed by both of said first data type operator and of said second data-type operator.

2. The apparatus of claim 1 wherein the communication system comprises a radio communication system which defines a pilot channel, the pilot channel forming the first channel, the first data-type data portion formed of a pilot signal, and wherein the channel phase estimated by said channel phase estimator is responsive to values of representations of both of the pilot signal and of the MAC data-type portion subsequent to stripping of the informational content out of the MAC data.

3. The apparatus of claim 2 wherein said first data-type operator further comprises a pilot-signal weighter for weighting the indications of the pilot signal by a first selected weighting factor, the indications of the pilot signal, once weighted, forming the representations of the pilot signal.

4. The apparatus of claim 3 wherein the MAC data-type operator further comprises a MAC-data weighter for weighting the indications of the MAC data-type portion by a second selected weighting factor, the indications of the MAC data-type portion, once weighted, forming the representation of the MAC-data type portion.

5. The apparatus of claim 4 further comprising a selector coupled to said pilot-signal weighter and to said MAC-data weighter, said selector for selecting the first and second weighting factors, respectively, by which indications of the pilot signal and of the MAC-data type portion are weighted, respectively.

6. The apparatus of claim 5 wherein selection by said selector of the first and second weighting factors is made according to a selected selection criteria; the selected selection criteria for maximizing a value of the estimated phase estimated by said estimator.

7. The apparatus of claim 1 wherein the first communication station forms part of a cellular communication system operable pursuant to an IS-95 (Interim Standard-1995) communication standard in which 1 xEV-DO technology is deployed, wherein the first data-type portion communicated upon the first channel comprises a pilot signal communicated upon a time slot defining a pilot channel, wherein the MAC data-type portion communicated upon the second channel comprises MAC-data signal communicated upon a the MAC-data channel and wherein the channel phase estimated by said channel phase estimator is formed responsive to values of the pilot signal and to values of the MAC-data signal.

8. The apparatus of claim 7 wherein the first communication station comprises a first mobile station, the cellular communication system further comprising a plurality of additional mobile stations, and wherein the MAC-data signal contains a plurality of MAC-data type portions sent to the first mobile station and to the plurality of the additional mobile stations, and wherein the channel phase estimate formed by said channel phase estimator is formed responsive to the plurality of the MAC-data type portions, free of the informational content or the MAC data-type portions.

9. The apparatus of claim 8 wherein said MAC data-type operator operates to strip the informational content out of each of the MAC-data type portions of the MAC-data signal.

10. The apparatus of claim 9 wherein the representations of the MAC-data type portions generated by said MAC data-type operator are representative of a combined total of channel estimates responsive to communication of each of plurality MAC-data type portions.

11. A for a first communication station to which data is communicated, the data including a first data-type portion communicated upon a first channel and MAC data-type portion upon a MAC channel, said method for estimating a channel phase characteristic associated with the first and at least second channels, said method comprising the operations of:
  operating upon indications of the first data-type portion sent to the second communication station upon the first channel, thereby to form a representation of the first-type data portion subsequent to communication upon the first channel;
  operating upon indications of the MAC data-type portion sent to the first communication station upon the MAC data channel, to strip informational content out of the MAC data-type portion thereafter to form a representation of the MAC data portion subsequent to communication upon the MAC data channel; and
  estimating the channel phase responsive to values of the representations formed during both of the operations of operating.

12. The method of claim 11 wherein the communication system comprises a radio communication system which defines a pilot channel the pilot channel forming the first channel, the first data-type portion formed of a pilot signal, and wherein the channel phase estimated formed during said operation estimating is formed responsive to representations of both the pilot signal and the MAC data portion.

13. The method of claim 12 wherein said operation of operating upon the indications of the first data-type portion further comprises the operation of weighting the indications of the pilot signal by a first selected weighting factor, the indications of the pilot signal, once weighted, forming the representation of the pilot signal.

14. The method of claim 13 wherein said operation of operating upon the indications of the MAC data-type portion further comprises the operation of weighting the indications of the MAC data-type portion by a second selected weighting factor, the indications of the MAC data-type portion, once weighted, forming the representation of the pilot signal.

15. The method of claim 14 further comprising the operation of selecting the first and second weighting factors, respectively, by which the indications of the pilot signal and of the MAC data-type portion are weighted, respectively.

16. The method of claim 11 wherein the first communication station forms part of a cellular communication system operable pursuant to an IS-95 (Interim Standard-1995) communication standard in which 1xEV-DO technology is deployed, wherein the first data-type portion communicated upon the first channel comprises a pilot signal communicated during a time slot defining a pilot channel, wherein the MAC data-type portion communicated upon the MAC-data channel comprises the MAC-data signal communicated upon a MAC-data channel and wherein the channel phase estimate generated during said operation of estimating is formed responsive to values of the pilot signal and to values of the MAC-data signal.

17. The method of claim 16 wherein the representations of the MAC-data signal generated during said operation of operating upon the MAC data-type is free of values of the MAC-data.

18. The method of claim 17 wherein the first communication station comprises a first mobile station, the cellular communication system further comprising plurality of additional mobile stations, and wherein the MAC-data signal comprises a plurality of MAC-data type portions sent to the first mobile station and to the plurality of the additional mobile stations, and wherein the channel phase estimate formed during said operation of estimating is formed responsive to the plurality of the MAC-data type portions free of the informational content of the MAC data-type portions.

* * * * *